United States Patent Office 3,296,279
Patented Jan. 3, 1967

3,296,279
NOVEL LACTONE DERIVATIVES AND
PRODUCTION THEREOF
Michiko Ikuta, Osaka, and Midori Miyawaki, Toyonaka-shi, Japan, assignors to Shionogi & Co., Ltd., Osaka, Japan
No Drawing. Filed Sept. 29, 1965, Ser. No. 491,426
Claims priority, application Japan, Oct. 3, 1964,
39/56,561
6 Claims. (Cl. 260—343.3)

The present invention relates to novel lactone derivatives and production thereof. More particularly, the present invention relates to sesquiterpenic lactone compounds useful as anti-inflammatory, tranquilizing and sedative agents and to the production of the sesquiterpenic lactone.

The said sesquiterpenic lactone compounds are represented by the following formula:

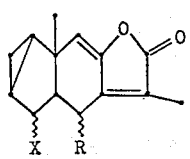

(I)

wherein R is hydrogen atom or hydroxyl group, X is methylene or methyl group and the ripple mark ($\{$) is a generic indication of both the α- and β-configurations.

Accordingly, it is an object of the present invention to embody the sesquiterpenic lactone compounds (I). Another object of this invention is to embody the sesquiterpenic lactone compounds (I) useful as anti-inflammatory, tranquilizing and sedative agents. A further object of the invention is to embody a process for preparing the sesquiterpenic lactone compounds (I). These and other objects will be apparent to those conversant with the art to which the present invention pertains from the subsequent description.

The present invention comprises reacting a sesquiterpenic furan compound represented by the general formula:

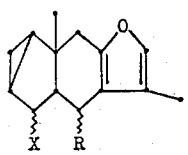

(II)

wherein R, X and the ripple mark ($\{$) have each the same significance as designated above with a quinone compound to give the corresponding lactone compound (I).

It has been found by the present inventors that the lactone compound (I) is prepared by reacting the furan compound (II) with dichlorodicyanobenzoquinone (DDQ), generally known as a quinone series dehydrogenating agent. There is no practical example about such a conversion of the furan compound by using a quinone compound to the lactone compound in a single step without fission of the furan ring and no report about the oxidation reaction by a quinone compound. Therefore, the present process is thought to be very unique.

The starting furan compounds (II) are known compounds, and some of them are natural and others synthetic [Tetrahedron, vol. 20, p. 2991 to 2997, (1964)]. Specific examples of the furan compound (II) are linderene, normal-dihydrolinderene and isodihydrolinderene.

The present process is effected by using more than equimolecular amounts of the quinone compound in an inert solvent at room temperature or a temperature lower than room temperature, if necessary, while heating suitably. In general, the reaction proceeds smoothly, and the byproduced hydroquinone compound may be precipitated and removed when a suitable solvent such as ether is selectively used. As the quinone compound, there can be used so-called quinone-series dehydrogenating agents. Above all, there are effectively used such a quinone compound having negative substituents as chloroanyl (2,3,5,6-tetrachloro-1,4-benzoquinone), dichlorodicyanobenzoquinone (DDQ: 2,3-dichloro-5,6-dicyano-1,4-benzoquinone), 3,4,5,6-tetrachloro-1,2-benzoquinone and 2,7,9,12-tetrachloro-1,8-diphenoquinone.

The thus obtained lactone compounds of the Formula I show various pharmacological activities such as anti-inflammatory activity, spontaneous motor activity decrease, tranquilizing activity or muscle relaxation and are useful as anti-inflammatory, tranquilizing and sedative agents. For instance, when 200 to 400 mg./kg. of the lactone compound of the formula:

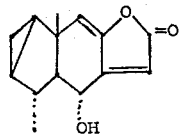

is applied to groups of mice (each group consisting of 10 mice) weighing 15 to 17 grams by intraperitoneal administration in a form of 50% arabic gum emulsion, there are observed the same tranquilizing and sedative activities as those of a commercially available tranquilizer, "Meprobamate" (commercial name of 2-methyl-2-propyl-1,3-propanediol dicarbamate). Still, the acute toxicity ($LD_{50}$) thereof to mice is over 1000.0 mg./kg.

Presently preferred and practical embodiments of the present invention are illustratively shown by the following examples.

Example 1

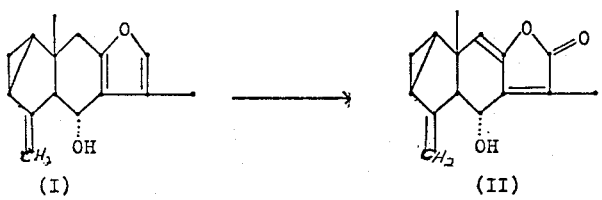

To a solution of linderene (I) (327 mg.) in anhydrous dioxane (5 ml.), there is added DDQ (1 g.) at room temperature. The resultant mixture is warmed at 50° C. on a water bath for 5 minutes, cooled and combined with ether (100 ml.). The ethereal layer is washed with dilute sodium carbonate solution and water in order, dried over anhydrous sodium sulfate and the ether evaporated. The yellow gelatinous residue (158 mg.) is chromatographed on alumina including 3% water, and the eluate with benzene including 5% ethyl acetate is concentrated to give crude lactone compound (II) (75 mg.) (yield: 22%). The crude lactone is recrystallized from a mixture of petroleum ether and ether to give colorless needles melting at 147 to 150° C.

IR: $\nu_{max}^{Nujol}$ 1780, 1665, 1641, 886 cm.$^{-1}$.

Example 2

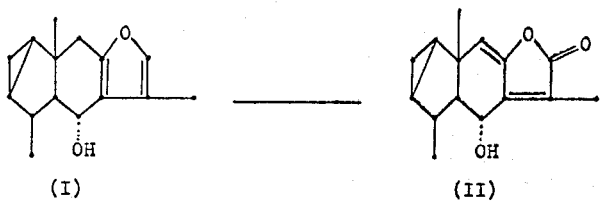

Normal-dihydrolinderene (I) (350 mg.) is reacted with DDQ (1 g.) in anhydrous dioxane (4.8 ml.) at 50° C. for 10 minutes and the reaction mixture shaken with ether (250 ml.). The ethereal layer is washed with dilute potassium carbonate solution and water in order, dried and the ether evaporated. The yellow gelatinous residue (258 mg.) is chromatographed on alumina including 3% water (Woelm, neutral II)(6 g.), and the eluate with benzene is concentrated to give crude lactone (II)(97 mg.) (yield: 26%) as crystals melting at 165 to 170° C. This substance is recrystallized from ether to give plates melting at 171 to 172.5° C.

IR: $\nu_{max}^{CCl_4}$ 3458, 1772, (1754), 1641 cm.$^{-1}$.

Example 3

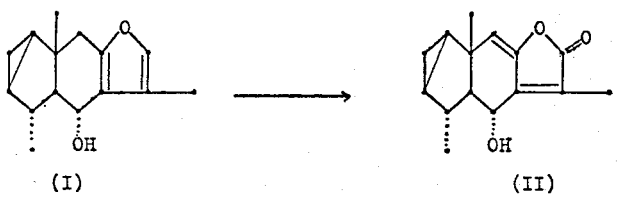

Iso-dihydrolinderene (I)(630 mg.) is reacted with DDQ (1.85 g.) in anhydrous dioxane (9 ml.) at 50° C. for 10 minutes, and the resultant mixture is treated as in the above example. The yellow gelatinous residue (477 mg.) is chromatographed similarly, and the eluate with benzene gives a crude lactone (II)(169 mg.) (yield: 24%). This substance is recrystallized from ether to give pure crystals (138 mg.) (yield: 21%) melting at 172 to 173.5° C.

IR: $\nu_{max}^{CCl_4}$ 3470, 1776, (1756); $\nu_{max}^{Nujol}$ 3426, 1748, 1642, 1628 cm.$^{-1}$.

What we claim is:
1. Process for preparing a sesquiterpenic lactone compound represented by the formula:

[structure]

wherein R is hydrogen atom or hydroxyl group, X is methylene or methyl group and the ripple mark (ξ) is a generic indication of both the α- and β-configurations which comprises reacting a sesquiterpenic furan compound represented by the formula:

[structure]

wherein R, X and the ripple mark (ξ) have each the same significance as designated above with a quinone compound.

2. Process as claimed in claim 1, wherein a quinone is DDQ (dichlorodicyanobenzoquinone).

3. A sesquiterpenic lactone compound represented by the formula:

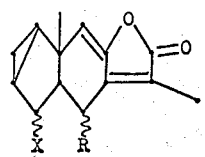

wherein R is hydrogen atom or hydroxyl group, X is methylene or methyl group and the ripple mark (⸮) is a generic indication of both the α- and β-configurations.

4. A sesquiterpenic lactone compound represented by the formula:

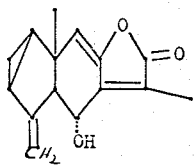

5. A sesquiterpenic lactone compound represented by the formula:

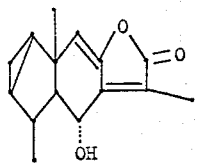

6. A sesquiterpenic lactone compound represented by the formula:

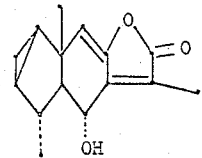

No references cited.

ALEX MAZEL, *Primary Examiner.*

J. A. NARCAVAGE, *Examiner.*